April 8, 1958  M. J. PRUNER  2,829,473
DRILL BIT GRINDER

Filed May 24, 1957  2 Sheets-Sheet 1

INVENTOR.
Maurice J. Pruner,
BY
Loyal J. Miller
ATTORNEY

April 8, 1958 M. J. PRUNER 2,829,473
DRILL BIT GRINDER
Filed May 24, 1957 2 Sheets-Sheet 2

Maurice J. Pruner, INVENTOR.
BY Loyal J. Miller
ATTORNEY

United States Patent Office 2,829,473
Patented Apr. 8, 1958

2,829,473

DRILL BIT GRINDER

Maurice J. Pruner, Oklahoma City, Okla.

Application May 24, 1957, Serial No. 661,500

6 Claims. (Cl. 51—219)

The present invention relates to grinding machines, and more particularly to a power driven hand tool for grinding or resharpening a twist drill bit.

Twist drill bits used in machining metal must be frequently sharpened to maintain a proper cutting angle on the drill tip. The cutting angle is the degree of sharpness or bluntness of the drill and varies with the kind of material to be drilled. Standard drills used generally in metal work are usually ground to a cutting angle of 59° making a total of 118° inclusive angle of the cutting end of the drill. Particular care must be exercised to insure that the cutting angle is equal on both sides of the drill. If, for example, the drill is fed into the work at the rate of 1/100 of an inch for each revolution, and the drill is inaccurately ground so that one cutting edge is 1/100 of an inch longer than the other, it follows that the longer cutting edge will be removing all of the cut each time the drill revolves. This results in drilling an off center hole, rapid heating of the drill as well as more rapid dulling of the cutting lips.

It is therefore the principal object of the present invention to provide a clamping means or holder having a grinding wheel associated therewith for accurately positioning a drill bit for re-sharpening the cutting tip thereof.

Another object is to provide a device of this class which is adaptable to be used in connection with a drill press or a portable hand drill for supplying the driving power for the grinder.

An additional object is to provide a device of this class which, when set to grind one side of the drill tip at the desired cutting angle, permits the bit to be moved for grinding the opposite side of the tip at the same angle without altering the adjusted position of the bit.

A further object is to provide a device of this class by which an inexperienced operator may easily position a twist drill bit for grinding the proper cutting angle.

Still another object is to provide a drill bit grinder having adjustable cutting angle positioning means for properly positioning a drill bit to grind the cutting tip thereof at selected angles.

Yet another object is to provide a device of this class having means associated therewith for limiting the amount ground off of the tip end of the drill being ground.

A still further object is to provide a device of this class comprising relatively few moving parts which may be economically manufactured and which, therefore, will be available to most any individual at a comparatively low cost.

The present invention accomplishes these and other objects by providing a cylindrical preferably vertically disposed hollow housing having closed ends. A grinding wheel is axially journaled in the housing by the upper end of the latter with the grinding wheel axle projecting upwardly above the housing and adapted to be gripped by the chuck of a hand drill, or the like. The upper end of the housing is provided with an elongated aperture laterally of its axis. Bracket means is pivotally connected to the side of the housing in off-set relation to the aperture. The bracket means includes a V-shaped trough having the axis thereof lying in a vertical plane, extending upwardly from the longitudinal axis of the aperture. Screw means, carried by the bracket, co-operates with the trough for holding a twist drill bit therein at a desired position. Drill cutting-lip positioning means is slidably carried by the apertured end of the housing. Cutting angle stop means, adjustably carried by the bracket, limits the angular movement of the latter by contacting the apertured end of the housing as the bracket is pivoted when grinding opposing sides of a drill tip. Grinding thickness gauge means, interposed between the cutting angle stop and the end of the housing, limits the amount of grinding action on a drill to be sharpened.

Other objects will be apparent from the following description when taken in conjunction with the accompanying two sheets of drawings, wherein.

Like characters of reference designate like parts in those figures of the drawings in which they occur.

In the drawings.

Figure 1:
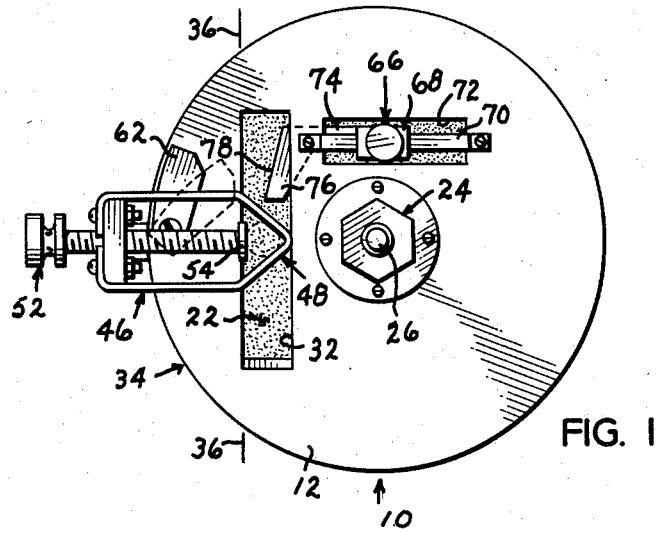
Figure 1 is a top plan view of the device per se.

The reference numeral 10 indicates a hollow cylindrical housing of a selected size having the axis thereof preferably disposed vertically and having closed upper and lower ends 12 and 14, respectively. The lower end 12 is removably secured to the side walls 16 of the housing as by screws 18. The upper end 12 is shown in the drawings integral with the side wall 18, but it seems obvious that this end may be made separate and secured by screws if desired. The lower surface of the lower or base end 14 is covered with a shoe 20 formed of rubber or other suitable material for increasing the co-efficient of friction between the base end 14 and a supporting surface.

An abrasive grinding wheel 22, having a periphery slightly smaller than the bore of the housing 10, is axially journaled therein by a suitable bearing 24 carried by the end 12 through which the grinding wheel axle 26 is extended. The grinding wheel axle 26 preferably extends upwardly above the end 12 a distance sufficient to permit the free end thereof to be inserted into the chuck 28 of a hand drill, or the like, not shown. The upper horizontally disposed surface or face 30 of the grinding wheel is preferably disposed in relatively close spaced relation adjacent the under or lower surface of the housing end 12, for the purposes which will presently be apparent.

A rectangular aperture or slot 32 is cut through the housing end 12 laterally of the axis of the latter. The aperture 32 thus substantially subtends an arc 34 of the housing periphery lying between the lines 36 (Fig. 1).

A bracket arm 40 is pivotally connected at one end to the wall 16 in spaced relation above the base end 14 at the central point of the arc 34 by bolt means 42. A spacer 44 is interposed between the arm 40 and the wall 16, thus disposing the arm in off-set relation to the wall 16. The arm preferably extends upwardly above the housing end 12 a selected distance. Substantially U-shaped strap iron bracket means 46, of a selected width, is secured to the upper end portion of the arm 40 and extends inwardly thereof toward the aperture 32 in spaced-apart relation above the latter. The inwardly disposed end of the bracket means forms a V-shaped trough 48 having the axis thereof parallel with relation to the arm 40 and lying in a vertical plane extending upwardly of the longitudinal axis of the aperture 32 perpendicular with relation to the horizontal plane of the grinding wheel face 30. Intermediate its ends, a portion of the V-shaped trough is arcuately cut away forming an opening 50 for the purposes which will presently be readily apparent. Screw means 52 is threadedly carried by the arm and extends centrally through the bracket 46 toward the opening 50 therein. A relatively small disk 54 is axially journaled by the inwardly disposed end of the screw 52 and co-operates with the screw and trough 48 for impinging and holding a twist drill-bit 56 to be sharpened axially disposed within the trough at a selected position. Thus, as is clearly shown by Fig. 4, the bracket means 46 and a drill bit 56 may be angularly pivoted with relation to the housing end 12 by means of the arm 40. The drill bit 56 is positioned within the bracket 46 so that the cutting lips or edges of the drill contact the face 30 of the grinding wheel when the arm 40 is pivoted to the positions shown in solid and dotted lines of Fig. 4. The desired cutting angle which is to be ground on the drill is regulated by stop or gauge means 58 in the form of a screw and nut which is adjustably positioned along the longitudinal axis of the arm 40 within a slot 60 cut therein. The screw or stop means 58 extends inwardly of the arm 40 a distance sufficient to permit the inwardly disposed end of the screw to contact the upper surface of the housing end 12 when the arm 40 is pivoted from side to side. Thus, vertical adjustment of the stop means 58 with relation to the arm 40 permits or limits the angular pivoting distance of the arm to a desired angle for grinding the drill.

A grinding thickness gauge 62 is pivotally connected to the upper surface of the housing end 12 so that one end portion of the gauge may be interposed between the stop means 58 and the upper surface of the housing end 12. The gauge is formed of relatively thin material, on the order of 1/16 of an inch or less, and when pivoted outwardly from contact with the stop means 58 permits the grinding of the drill cutting tip an amount equal to the thickness of the gauge 62.

Twist drill cutting-lip positioning means 66 comprises a bracket 68 slidably carried by an arm 70 carried by the housing end 12 and extending laterally of one end portion of the aperture 32 in perpendicular relation thereto. The bracket 68 extends downwardly through the housing end 12 through a co-operatingly disposed slot 72 and is provided with a gauge arm 74 which extends toward the aperture 32. The gauge arm 74 is formed of relatively thin material and has the free end portion 76 thereof adapted to extend laterally of the slot 72 in angular relation. The free edge 78 of the end portion 76 is disposed on an angle of 12° to 15° with relation to the longitudinal axis of the aperture 32. The free edge 78 is preferably disposed in relatively close spaced relation to the face 30 of the grinding wheel.

Operation

Figure 2:
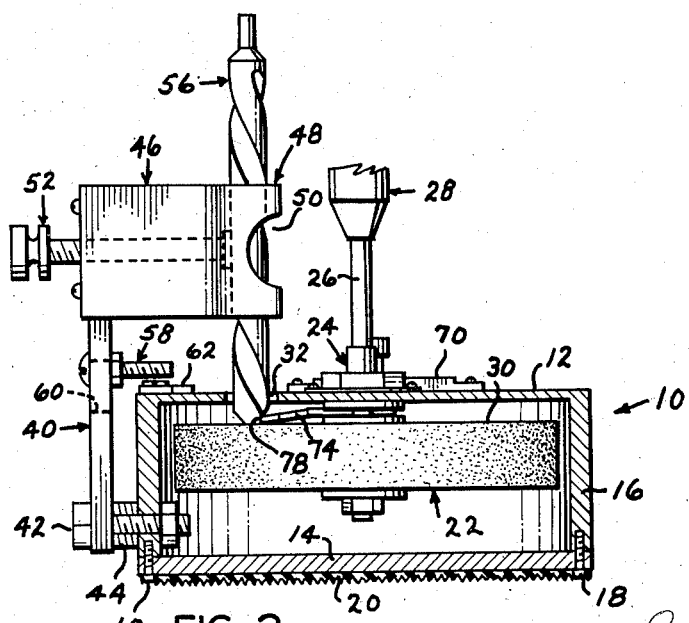
Figure 2 is a vertical cross sectional view of the device partly in elevation, illustrating the manner of positioning a twist drill bit therein.
Figure 3:
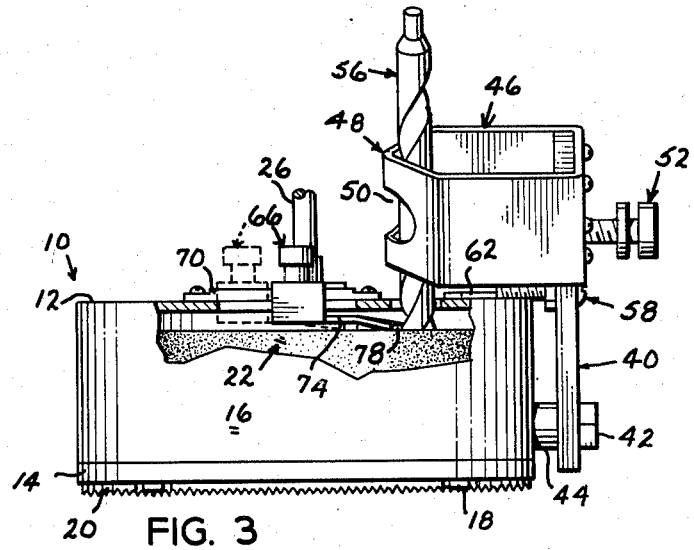
Figure 3 is a side elevational view of the device in drill bit grinding position, a portion of the housing being broken away for clarity.
Figure 4:
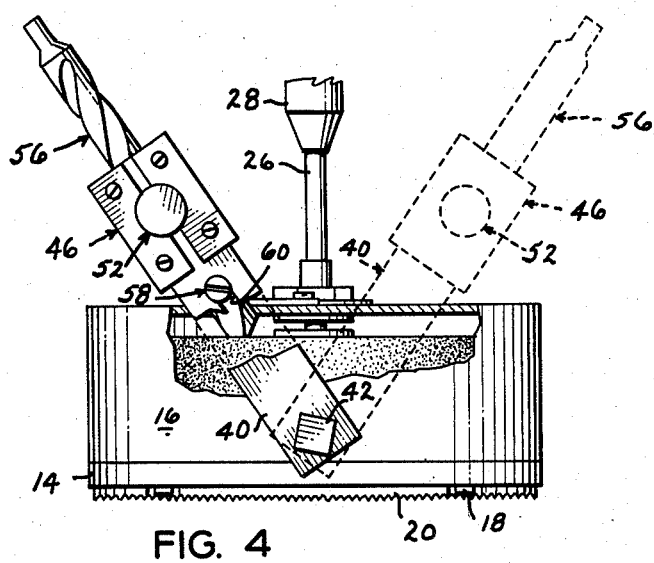
Figure 4 is a side elevational view of the device rotated 90° with respect to Fig. 3, illustrating in dotted lines the angular movement of the drill bit bracket holding means.

The bracket means 46 is disposed in the position shown by the solid lines in Fig. 4, and a twist drill 56 to be sharpened, is axially placed within the trough 48 with the cutting end of the drill disposed downwardly and in contact with the grinding wheel face 30. The cutting-lip positioning means 66 is manually adjusted along the arm 70 to position the free edge 78 of the arm 74 in contact with one of the drill cutting lips. Obviously the drill must be simultaneously rotated to properly align the cutting-lip with the edge 78 as the latter is moved into contact with the drill (Fig. 2). This properly positions the cutting-lip of the drill 56 for grinding the same. The screw 52 is adjusted so that the disk 54 impinges the drill within the trough 48. The positioning means 66 is then moved out of contact with the drill lip. The gauge 62 is interposed between the stop 58 and the housing end 12 and the stop is adjusted longitudinally of the arm 40 to limit the angular movement of the arm with relation to the vertical. The gauge 62 is pivoted out of stop contacting position and the axle 26 of the grinding wheel is connected to the chuck 28 of a hand drill, or the like, for power driving the grinding wheel. The bracket arm 40 is pivoted to the solid line position of Fig. 4, such movement being limited by the stop 58, thus grinding the proper cutting angle on one side of the drill 56. After grinding this one side of the drill the opposite side is ground by simply pivoting the arm 40 to the position shown by dotted lines (Fig. 4) which is similarly limited by the stop 58 contacting the housing end 12. It seems obvious from the above description that the device will thus accurately grind both cutting-lips of a drill bit to the desired angle. Relatively small drill bits, not shown, may be sharpened by the device, since the opening 50 permits the disk 54 to project outwardly therethrough and impinge the small bit within the V-shape.

It seems obvious that any desired cutting angle may be ground on the drill by simply adjusting the stop 58 for limiting the movement of the arm 40. Relative angular positions, not shown, are preferably scored on the arm 40 for accurately positioning the stop 58. Obviously the aperture 32 is formed of a length to adequately accommodate the drill bit 56 when moved through the greatest angle it may be desired to grind the same, and transversely the width of the aperture is determined by the size of the drill bits desired to be ground.

Obviously the invention is susceptible to some change or alteration without defeating its practicability, and I therefore do not wish to be confined to the preferred embodiment shown in the drawings and described therein, further than I am limited by the scope of the appended claims.

I claim:

1. A twist drill bit sharpening device, including: a vertically disposed hollow cylindrical housing having closed ends, the upper end of said housing having an elongated rectangular aperture therethrough off-set with relation to the axis of said housing; a grinding wheel axially journaled within said housing adjacent said upper closed end; means for rotating said grinding wheel; a bracket arm pivotally mounted at one end to the wall of said housing adjacent said aperture, said bracket arm extending upwardly above the upper end of said housing; bracket means secured to the free end portion of said bracket arm, said bracket means extending inwardly of said bracket arm in spaced relation above the aperture in said housing and defining a V-shaped trough having the axis thereof lying in a vertical plane extending above the aperture in said housing; screw means carried by said bracket arm and co-operating with the V-shaped trough of said bracket means for holding a twist drill bit therein at a predetermined position; twist drill cutting-lip positioning means slidably carried laterally of the aperture by the upper end of said housing for positioning the end of a twist drill to be sharpened; a drill bit cutting angle gauge adjustably carried by said bracket arm and adapted to contact the upper end surface of said housing and adjustably limit the pivoting action of said bracket arm, whereby to position a twist drill to be sharpened against the adjacent surface of said grinding wheel at a predetermined angle; and a grinding thickness gauge pivotally mounted on said housing and interposed between said cutting angle gauge and the upper surface of said housing for limiting the amount of grinding action on a twist drill to be sharpened, said thickness gauge being movable into and out of cutting angle gauge contacting position.

2. A twist drill bit sharpening device, including: a vertically disposed hollow cylindrical housing having closed ends, the upper end of said housing having an elongated rectangular aperture therethrough subtending an arc of the periphery of said housing; a grinding wheel axially journaled within said housing, one side surface of said grinding wheel being disposed horizontally adjacent said upper closed end; means for rotating said grinding wheel; a bracket arm pivotally mounted at one end to the wall of said housing centrally of the arc subtended by said aperture, said bracket arm extending upwardly above the upper end of said housing; bracket means secured to the free end portion of said bracket arm, said bracket means extending inwardly of said bracket arm in spaced relation above the aperture in said housing and defining a V-shaped trough having the axis thereof lying in and movable through a vertical plane extending above the longitudinal axis of the aperture in said housing aperture and inclined to the horizontal plane of the adjacent surface of said grinding wheel as said bracket arm is pivoted; screw means carried by said bracket arm and cooperating with the V-shaped trough of said bracket means for holding a twist drill bit therein at a predetermined position; twist drill cutting-lip positioning means slidably carried laterally of the aperture by the upper end of said housing for positioning the end of a twist drill to be sharpened; a drill bit cutting angle gauge adjustably carried by said bracket arm and adapted to contact the upper end surface of said housing and adjustably limit the pivoting action of said bracket arm, whereby to position a twist drill to be sharpened against the adjacent surface of said grinding wheel at a predetermined angle; and a grinding thickness gauge pivotally mounted on said housing and interposed between said cutting angle gauge and the upper surface of said housing for limiting the amount of grinding action on a twist drill to be sharpened, said thickness gauge being movable into and out of cutting angle gauge contacting position.

3. A twist drill bit sharpening device, including: a vertically disposed hollow cylindrical housing having closed ends, the upper end of said housing having an elongated rectangular aperture therethrough off-set with relation to the axis of said housing; a grinding wheel axially journaled within said housing adjacent said upper closed end; means for rotating said grinding wheel; bracket means pivotally mounted on said housing adjacent the aperture and projecting upwardly thereabove, said bracket means including a V-shaped trough having the axis thereof lying in a vertical plane extending above the aperture in said housing; screw means carried by said bracket means and co-operating with the V-shaped trough for holding a twist drill-bit therein at a predetermined position; twist drill lip-cutting positioning means slidably carried laterally of the aperture by the upper end of said housing for positioning the end of a twist drill to be sharpened; drill bit cutting angle gauging means carried by said bracket means and adapted to contact the upper surface of said housing and limit the angular pivoting movement of said bracket means; and grinding thickness gauge means pivotally mounted on said housing and interposed between said cutting angle gauging means and the upper surface of said housing for limiting the amount of grinding action on a twist drill to be sharpened, said thickness gauging means being movable into and out of contact with said cutting angle gauge.

4. A twist drill-bit sharpening device, including: a vertically disposed hollow cylindrical housing having closed ends, the upper end of said housing having an elongated rectangular aperture therethrough off-set with relation to the axis of said housing; a grinding wheel axially journaled within said housing adjacent said upper closed end; means for rotating said grinding wheel; bracket means pivotally mounted on said housing adjacent the aperture and projecting upwardly thereabove, said bracket means including a V-shaped trough having the axis thereof lying in and angularly movable through a vertical plane extending above the aperture in said housing; screw means carried by said bracket means and co-operating with the V-shaped trough for holding a twist drill bit therein at a predetermined position; twist drill lip-cutting positioning means slidably carried laterally of the aperture by the upper end of said housing for positioning the end of a twist drill to be sharpened; drill-bit cutting angle gauging means carried by said bracket means and adapted to contact the upper surface of said housing and limit the angular pivoting movement of said bracket means; and grinding thickness gauge means pivotally mounted on said housing and interposed between said cutting angle gauging means and the upper surface of said housing for limiting the amount of grinding action on a twist drill to be sharpened, said thickness gauging means being movable into and out of contact with said cutting angle gauge.

5. A twist drill-bit sharpening device, including: a vertically disposed hollow cylindrical housing having closed ends, the upper end of said housing having an elongated rectangular aperture therethrough in offset-relation to the axis of said housing; a grinding wheel axially journaled within said housing adjacent said upper closed end; means for rotating said grinding wheel; bracket means pivotally mounted on said housing adjacent the aperture and projecting upwardly thereabove, said bracket means forming a V-shaped trough having the axis thereof lying in a vertical plane extending above longitudinal axis of the aperture; screw means carried by said bracket means and co-operating with the V-shaped trough for holding a twist drill-bit to be sharpened therein at a predetermined position; drill bit cutting angle gauging means carried by said bracket means and adapted to contact the upper surface of said housing and limit the angular pivoting movement of said bracket means; and grinding thickness gauge means pivotally mounted on said housing and interposed between said cutting angle gauging means and the upper surface of said housing for limiting the amount of grinding action on a twist drill to be sharpened, said thickness gauging means being movable into and out of contact with said cutting angle gauging means.

6. A twist drill-bit sharpening device, including: a hollow cylindrical housing having closed ends, one end of said housing having an elongated rectangular aperture therethrough subtending an arc of the periphery of said housing; a grinding wheel axially journaled within said housing adjacent said apertured end; means for rotating said grinding wheel; bracket means pivotally mounted on the wall of said housing centrally of the arc subtended by the aperture and projecting outwardly from said one end of said housing, said bracket means including a V-shaped trough having the axis thereof lying in and angularly movable through a plane perpendicular to the apertured end of said housing; screw means carried by said bracket means and co-operating with the V-shaped trough for holding a twist drill bit therein at a predetermined position; twist drill lip-cutting positioning means slidably carried laterally of the aperture by the said one end of said housing for positioning the end of a twist drill to be sharpened; drill-bit cutting angle gauging means carried by said bracket means and adapted to contact the outer surface of said one end of said housing and limit the angular pivoting movement of said bracket means; and grinding thickness gauge means pivotally mounted on said housing and interposed between said cutting angle gauging means and the outer surface of said one end of said housing for limiting the amount of grinding action on a twist drill to be sharpened, said thickness gauging means being movable into and out of contact with said cutting angle gauge.

References Cited in the file of this patent
UNITED STATES PATENTS
2,524,279    Van Wyk _____ Oct. 3, 1950